United States Patent [19]

Millard et al.

[11] 4,090,231

[45] May 16, 1978

[54] SCREEN PRINTED SOLID ELECTROLYTIC CAPACITOR

[75] Inventors: Richard J. Millard, Kennebunk; David R. Poat, Wells, both of Me.

[73] Assignee: Sprague Electric Company, North Adams, Mass.

[21] Appl. No.: 526,184

[22] Filed: Nov. 22, 1974

Related U.S. Application Data

[62] Division of Ser. No. 376,499, Jul. 5, 1973, Pat. No. 3,889,357.

[51] Int. Cl.² .............................................. H01G 9/00

[52] U.S. Cl. .................................................... 361/433

[58] Field of Search ......................... 317/230; 361/433

[56] References Cited

U.S. PATENT DOCUMENTS

| | | | |
|---|---|---|---|
| 3,403,303 | 9/1968 | Klein | 317/230 |
| 3,465,426 | 9/1969 | Baier et al. | 317/230 |
| 3,475,659 | 10/1969 | Buice et al. | 317/230 |
| 3,491,270 | 1/1970 | Gabriel et al. | 317/230 |
| 3,544,434 | 12/1970 | Giller et al. | 317/230 |
| 3,579,811 | 5/1971 | Matsuo et al. | 317/230 |
| 3,579,813 | 5/1971 | Tomiwa | 317/230 |
| 3,586,924 | 6/1971 | Gebert et al. | 317/230 |

*Primary Examiner*—Stanley D. Miller, Jr.
*Assistant Examiner*—Joseph F. Clawson, Jr.
*Attorney, Agent, or Firm*—Connolly and Hutz

[57] ABSTRACT

A solid tantalum capacitor is made by screen printing on a tantalum substrate, a thick mixture of tantalum powder and a binder, sintering the printed layer, forming a dielectric oxide, and forming a counterelectrode. A large number of capacitors may be so made on a single substrate and thereafter individual or groups of capacitors are separated, and may have leads attached thereto. The planar geometries provide simple packaging on conventional DIP's and in hybrid integrated circuits.

16 Claims, 16 Drawing Figures

46 47 48 45 43 44 44 42 41 40

Fig.1. 10 11 12
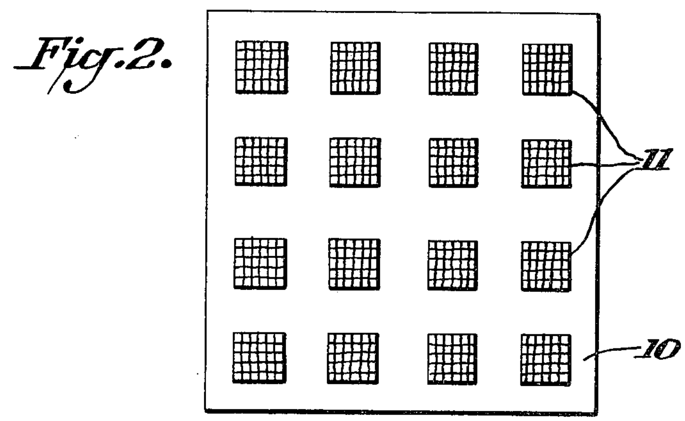
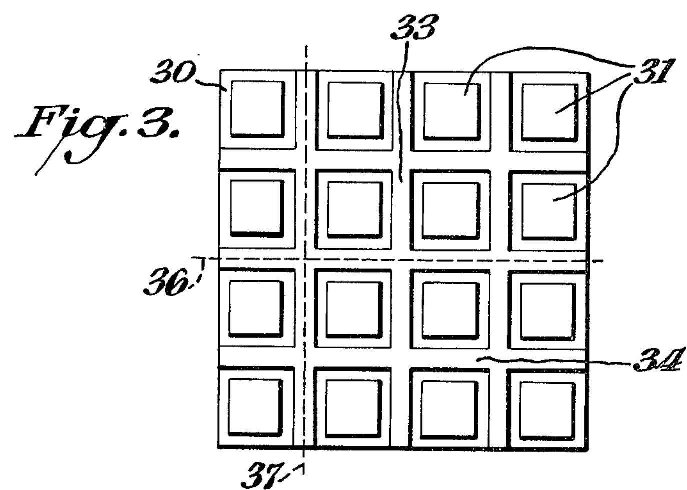
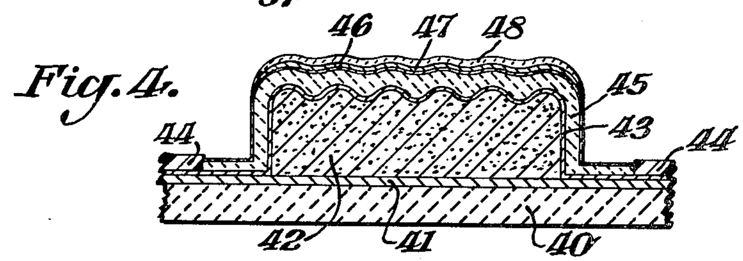

50
51
54
55

61
60
63

61
62
60
63
64
67
68
69

61
60
63
65
66

71
70
73

71
72
70
73
77
78
79

71
70
73
75
76
8
8

80
75
76
71
72
70
73

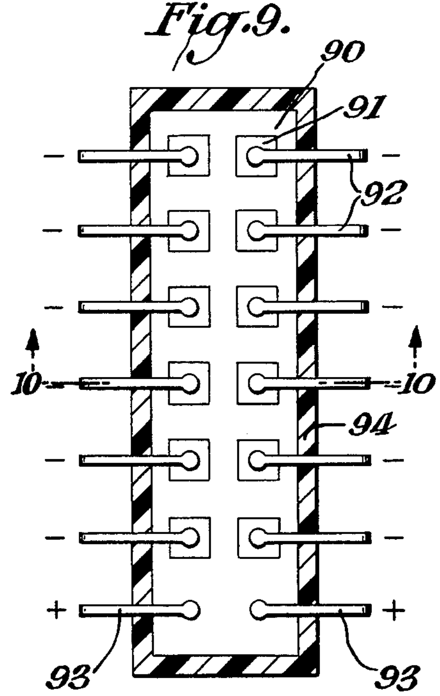
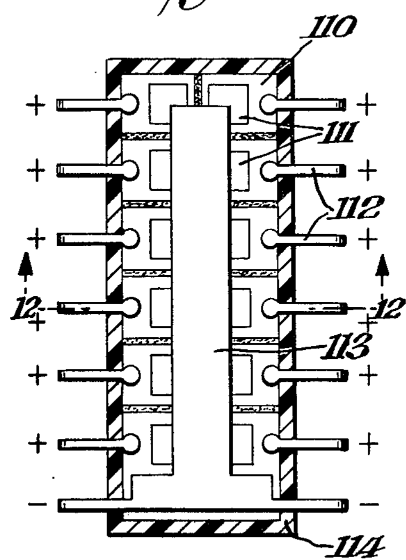
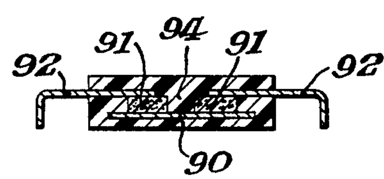
Fig.10.
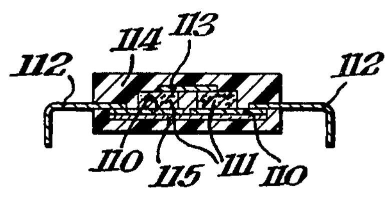
Fig.12.

SCREEN PRINTED SOLID ELECTROLYTIC CAPACITOR

CROSS REFERENCE TO RELATED APPLICATION

This application is a division of application Ser. No. 376,499 filed July 5, 1973 now U.S. Pat. No. 3,889,357.

BACKGROUND OF THE INVENTION

This invention relates to the manufacture of solid electrolytic capacitors and more particularly to making solid electrolytic tantalum capacitors by forming a porous tantalum pellet on a substrate having at least one face made of tantalum, wherein the tantalum face serves as the anode connection.

The majority of solid tantalum capacitors are made today by compressing a free-flowing tantalum powder, either with or without a binder, into a mold, removing from the mold, sintering, forming a dielectric oxide, covering with a solid electrolyte and forming a counterelectrode.

For those uses requiring high component packing densities especially in planar mounting and hybrid integrated circuit systems, there have been proposed several varieties of solid tantalum capacitor structures employing a tantalum substrate carrier. In several cases, the tantalum substrate has cavities or cups formed therein, in which tantalum powder is dispersed and sintered. In another arrangement, a flat tantalum substrate is overlaid by a tantalum template wherein the powder is confined. The geometry of the above mentioned substrates or templates narrowly determines and limits the geometry of the porous tantalum pads thus produced. The template system is particularly limiting since the thickness of the template determines closely the height of the tantalum powder pads and must either be carefully removed to avoid destroying pads or must be carried through the sintering process. The previous systems of powder on substrate require a special commitment to tooling for each size of capacitor to be produced, not unlike the more conventional molded pellet system. In addition, the methods of the prior art tend to produce a sintered tantalum body having a smooth surface. Thus the introduction for example of a solution of manganous salts into the porous body is achieved by special means that must overcome the tendency of the salt solution to run off of the smooth surface.

These previous methods are suitable for making a number of solid tantalum capacitors on the same substrate. However they are limited by the necessary tooling with respect to the minimum capacitor size and spacing between capacitors. It is desirable to achieve smaller capacitors having high capacity-voltage capability and closer spacing, both for the advantages of further miniaturization and for the economy of production.

It is therefore an object of the present invention to provide highly miniaturized solid tantalum capacitors.

It is a further object of this invention to provide multiple solid tantalum capacitors having a high packing density.

It is a further object of this invention to provide a process for manufacturing solid tantalum capacitors requiring only low cost and readily acquired tooling, which method will reduce the cost of manufacturing.

It is a further object of this invention to provide solid tantalum capacitors being capable of direct connection or connection by use of leads and otherwise potentially capable of meeting a great variety of requirements for packaging and mounting.

These and other objects will become apparent in the following description.

SUMMARY OF THE INVENTION

A method for manufacturing solid electrolytic capacitors comprises screen printing one or more layers of a mixture of a valve metal powder in a liquid binder onto the face of a substrate, which face is made of the same kind of valve metal. The printed composite layer is sintered, resulting in a porous valve metal pad being sinter bonded to the valve metal face of the substrate. The sintered pad has a rough surface exhibiting a pattern reflecting that of the screen mesh. A valve metal oxide film is formed, a solid electrolyte of $MnO_2$ is applied over the film, and a counterelectrode is applied over the $MnO_2$. Many capacitors can be made simultaneously on one substrate and subsequently cut apart into groups of one or more capacitors. Screen printing is advantageously employed in the steps of masking between capacitor elements and in application of the counterelectrode. Such screens constitute the major requirements for tooling for the manufacturing process, thus presenting a comparatively low cost tooling system and a unified and comparatively low cost production facility. Both discrete and multiple capacitors made by this method are shown employing a variety of lead connective means, or of assembly without leads, for example to an integrated circuit substrate by a normal flip chip attachment method.

BRIEF DESCRIPTION OF THE DRAWINGS

In FIG. 1 is shown the side view of a tantalum substrate having pads of tantalum deposited thereon.

In FIG. 2 is shown the top view of the assembly of FIG. 1.

In FIG. 3 is shown a top view of a tantalum substrate having sixteen tantalum capacitor elements formed thereon.

In FIG. 4 is shown a magnified cross-section of a typical capacitor element of this invention.

In FIG. *6a* is shown a non-polar capacitor of this invention.

In FIG. *6b* is shown the capacitor of FIG. *6a* mounted in flip-chip fashion on a printed wire board or on an integrated circuit.

In FIG. *6c* is shown the capacitor of FIG. *6a* with lead tabs attached.

In FIG. *7a* is shown a top view of a polar capacitor of this invention.

In FIG. *7b* is shown the capacitor of FIG. *7a* mounted in flip-chip fashion.

In FIG. *7c* is shown the capacitor of FIG. *7a* with lead tabs attached.

Figure 8:
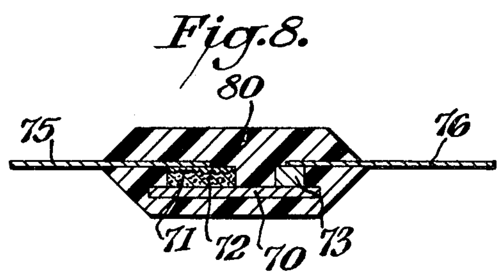

In FIG. 8 is shown the sectional view of a DIP package incorporating the capacitor of FIG. *7c*, in plane 4—4.

In FIG. 9 is shown a package wherein a multiple capacitor of this invention has a common anode connection.

In FIG. 10 is shown a sectional view of the capacitor of FIG. 9 in plane 5—5.

In FIG. 11 is shown a package wherein a multiple capacitor of this invention has a common cathode.

In FIG. 12 is shown a sectional view of the capacitor of FIG. 11 in plane 6—6.

DESCRIPTION OF THE PREFERRED EMBODIMENT

In a preferred method of the present invention, there is screen printed upon a tantalum sheet, one or more thick film pads of a thick ink containing tantalum powder. In FIG. 1 is shown a side view and in FIG. 2 is shown a top view of a tantalum substrate 10 with thick pads 11 deposited thereon.

A suitable screen printing ink is prepared by mixing finely divided tantalum powder with a binder and if necessary a thinner or solvent such that a thick horizontal pad of the ink as screened, exhibits essentially no leveling or flow under still conditions, i.e. conditions of zero agitation.

The screen is masked so as to permit the passage of ink through only certain portions of the screen and more specifically in the present example to form the pads 11. The sixteen pads shown are merely illustrative, since one pad or several thousand pads may thus be screen printed on a single substrate.

Each pad 11 is shown to have a rough surface 12, and in fact this surface roughness has a pattern reflecting the pattern of the screen itself. This surface roughness is peculiarly advantageous to the manufacture of solid tantalum capacitors as will be shown, and the lack of flow permits the printing of wet ink pads whose separation and spacing is retained. This latter feature permits high density printing of small pads that otherwise might run together or preclude the use of inter-pad spaces for other purposes.

In the preferred method, the ink is screen printed onto a tantalum substrate providing a thin layer of ink of several mils thickness, e.g. 0.004 inches. A blast of hot air is directed for a few seconds onto the top surface of the substrate and the ink layer, causing volatiles within the ink to evaporate and solidifying the layer. A second layer of ink is printed atop and registered with the first layer. Heat is applied again to solidify the second layer. The printing and heating steps may be repeated as many times as necessary to achieve a composite layer of the solidified tantalum mixture of the desired thickness. Of course one layer may be sufficient.

The substrate is then placed in a vacuum furnace and sintered at a temperature between 1550° and 2000° C. During this high temperature vacuum exposure the tantalum ink binder is decomposed and driven off and the tantalum particles become bonded to one another and to the underlying tantalum substrate. The result is a highly porous layer or pad of tantalum being sinter bonded to the tantalum substrate.

Contact to the substrate is made by means of a tantalum lead wire or tab extending from the substrate, and the substrate and porous tantalum layer are anodized by well known methods creating a tantalum oxide film over all tantalum surfaces. The tantalum oxide becomes the capacitor dielectric.

After rinsing and removing the anodizing electrolyte, a barrier coating of for example silicone varnish or TEFLON material is applied over the oxidized tantalum face in regions between the tantalum pads. (TEFLON is a Trademark of E.I. DuPont Company). A particular TEFLON material found useful is DuPont #851-204. Many other fluorocarbon materials will be suitable.

In FIG. 3 is shown the tantalum substrate 30 with barrier coating paths, e.g. 33 and 34, between the pads 31. The coating is preferably applied by screen printing after which it is cured by heating. When later cutting apart the capacitor elements, this coating primarily serves to prevent shorting between the tantalum face anode connection and the solid manganese dioxide electrolyte that will next be applied to the porous tantalum pads. The manganous nitrate which becomes converted to manganese dioxide does not wet and adhere to the barrier coating. Other methods may be used for applying the coating including dispensing the wet coating material by means of a pen, for example pen, type AR21, made by the Wood-Regan Instrument Company, Nutley, N. J. In this method of coating, all parallel paths may be drawn simultaneously using a number of such pen instruments that are mechanically ganged.

The substrate is then held by one edge and immersed in an aqueous solution of a manganous salt, preferably manganous nitrate. Upon removal, the manganous nitrate drains away easily from the smooth surfaces while remaining in substantial thickness over the rough surfaces of the porous tantalum pads. The substrate is placed in an oven having a temperature of from 250° to 450° C, causing the manganous nitrate first to permeate the porous tantalum pads, and then to pyrolize and become transformed into manganese dioxide ($MnO_2$). The $MnO_2$ forms the cathode electrode. It is conventional practice to reform the tantalum oxide film at this point.

Colloidal graphite is deposited over the manganese dioxide and may be applied by selectively screen printing atop the pads, and heating to solidify. A silver paste, made of silver particles held in an acrylic binder (e.g. DuPont 4817) is applied over the graphite by selectively screen printing or alternatively by brushing. It is then heated and cured. If desirable, the substrate may now be dipped in molten 60/40 tin-lead solder having about 2% silver content at about 200° C. Alternatively a solder paste may be applied to the silver by screen printing and reflowing at a temperature of 200° C. This graphite-silver-solder system is but one of many effective counterelectrodes that may be applied over the solid electrolyte to form the capacitor element connective means. For example a silicone resin loaded with silver particles may be substituted for the acrylic silver paste aforementioned. Obviously the particular solder alloy used may be chosen to accommodate a variety of needs including high temperature (e.g. 400° C) reflow attachment of capacitor cathodes to an integrated circuit substrate.

It is especially noteworthy that all the above mentioned manufacturing process steps that provide definition, may be accomplished by screen printing while other involve dipping or submersing. Thus only low cost and readily fabricated tooling is required to provide multiple or single capacitor parts of great variety in size, geometry, and ratings.

It will be recognized that after the application of the counterelectrode, each tantalum pad has been developed and transformed into a solid tantalum capacitor element, all such elements having a common anode connection in the tantalum face of the substrate.

The capacitor elements thus formed may now be separated, either into individual capacitors or in groups. This is achieved by cutting or otherwise separating the tantalum substrate in the spaces between pads having a barrier coating. Typical cut locations are shown as dotted lines 36 and 37 in FIG. 3. The cutting may be accomplished by any one of several well known semiconductor wafer dicing means. For example the abrasive wire saw described by E. C. Forcier in U.S. Pat. No. 3,435,815 issued Apr. 1, 1969, has proven effective. Laser cutting is also appropriate. Such cutting and separating means results in essentially no waste of expensive tantalum material and is particularly appropriate for the small element dimensions and close spacing by which multiple capacitors of this invention may be characterized.

In FIG. 4 is shown a magnified cross-sectional detail view of just one tantalum capacitor element. A ceramic substrate 40 has a tantalum film 41 deposited on a top face. Otherwise the detail in FIG. 4 may represent one of the capacitor elements of FIG. 3. A tantalum pad 42 is seen sinter bonded to the tantalum face of the substrate 40. A tantalum oxide film 43 is shown over all exposed regions of the tantalum face 41 and the porous tantalum pad 43 (including all its interstitial surfaces). Barrier coating 44 covers a portion of the tantalum oxide that is over the tantalum face of the substrate 40. A solid manganese dioxide electrolyte 45 covers the tantalum oxide film 43 except where stopped by the barrier coating 44. Atop the $MnO_2$ electrolyte, a counterelectrode is built of successive layers of graphite (carbon) 46, silver 47, and solder 48.

Figure 5:
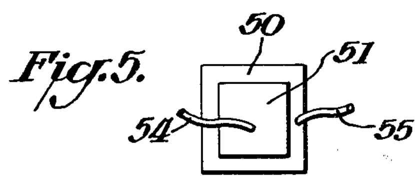
In FIG. 5 is shown a top view of a polar capacitor of this invention, having been cut from an assembly of a large number of similar capacitors, and having lead wires attached.

In FIG. 5 is shown an individual solid tantalum capacitor having been cut from a multiple capacitor substrate such as that described in FIG. 3. A cathode lead wire 54 is shown attached to the counterelectrode of the capacitor 51 and an anode wire lead 55 is attached to the tantalum sheet 50. Such leads may be so connected before the individual capacitor elements have been separated. It can be seen that the capacitor of FIG. 5 is especially suitable for mounting and connection in a hybrid integrated circuit wherein a normal thermocompression bonding method may be used to attach lead wires 54 and 55 between the capacitor and the circuit.

Figure 6A:
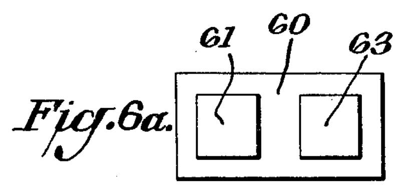
Figure 6B:
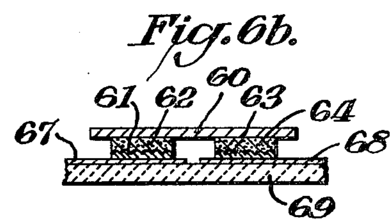
Figure 6C:
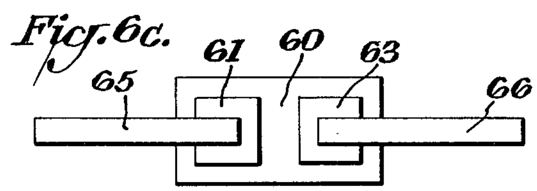

In FIG. 6a is shown a group of two capacitors sharing the same tantalum substrate 60. By making contact to the counterelectrodes 61 and 63 on capacitor pads 62 and 64, respectively, a single leadless non-polar capacitor is realized. The non-polar configuration may be mounted in an inverted position as shown in FIG. 6b without leads in the manner of a "flip-chip", whereby for example the counterelectrode has an outer coating of solder such that the substrate 60 may be "flipped" over with the solder coating facing solderable lands 67 and 68 on a hybrid integrated circuit 69 and a joint is effected therebetween by applying heat and reflowing the solder. Alternatively, metal tabs 65 and 66 as shown in FIG. 6c may be attached to the counterelectrodes 61 and 63, respectively, thereby providing a non-polar capacitor with leads. Lead attachment may be accomplished by reflow soldering, or other means.

Figure 7A:
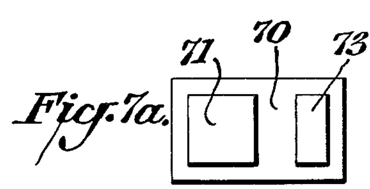
Figure 7B:
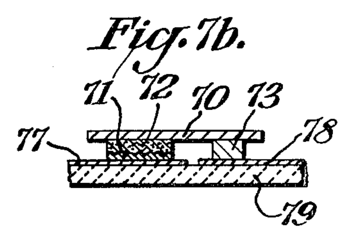
Figure 7C:
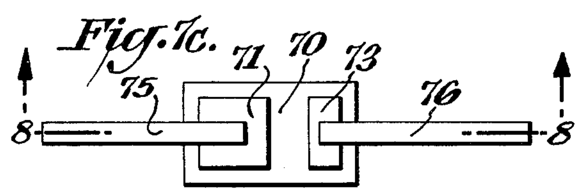

In FIG. 7a is shown a single capacitor element 71 on a tantalum substrate 70 and having a metal bar 73, being preferably of nickel or KOVAR (a Tradename for an expansion alloy of the Westinghouse Electric Corp., Blairsville, Pa.), spot or stitch welded to the substrate after application of counterelectrode materials. Such a weld may be made through the barrier layer and tantalum oxide film by an energy discharge weld method. The bar 73 is advantageously about the same height as the capacitor body 72 such that when inverted the capacitor may be mounted evenly as shown in FIG. 7b on a circuit 79 connecting to lands 77 and 78 as a leadless, flip chip, polar capacitor. Alternatively as shown in FIG. 7c, metal tab leads 75 and 76 may be attached to the counterelectrode 71 and to the bar 73 respectively to provide leaded connection to the capacitor.

It can be seen that single or multiple capacitors of this invention, for example those of FIG. 6 and FIG. 7 are suitable for incorporation in a molded component package, such as the conventional dual-inline-package (DIP) that is popularly employed for printed wire board mounting. FIG. 8 shows a cross-sectional side view in plane 8—8 of such a package wherein a plastic material 80 encompasses the body of the capacitor of FIG. 7 and a portion of the tab leads. The tab leads 75 and 76 may be formed from an original part of a conventional lead frame, to which capacitors of this invention as well as other components are usually welded, soldered, or otherwise connected prior to molding.

Additional dual-inline-package configurations may be constructed with capacitors of this invention whereby the capacitors may be connected by means of either a common positive terminal or a common negative terminal. In FIG. 9 is shown a package wherein 12 discrete capacitors 91 are contacted by two metal tab leads 93, which are connected to the tantalum face 90 of a substrate and which in turn is common to all of the tantalum pads, thereby creating an array of capacitors with common positive polarity. A metal tab lead 92 is attached to the counterelectrode of each capacitor thus providing discrete negative connections. FIG. 10 shows a cross-sectional view in plane 10—10 of the package of FIG. 9 encapsulated by a plastic insulative material 94.

Although the above described capacitors and methods for making them have employed a tantalum substrate, it should be noted that other substrate materials such as 99.5% pure alumina having a thin film of tantalum sputtered on one face thereof is suitable. Such high purity alumina can withstand sintering temperatures of about 1600° C without adversely affecting the quality of the tantalum anode. When an alumina substrate is used for the manufacture of capacitors pertaining to this invention, it will be appropriate to employ the standard method of scribing and breaking to separate capacitor bodies.

In order to produce a DIP package of a plurality of capacitors with a common negative polarity, an alumina substrate of the kind described above may be employed. Following manufacture of the capacitors of this invention, the capacitors may be isolated, but retained on the same substrate, by vaporizing the tantalum film between capacitors. For instance, a laser beam may be used to vaporize the tantalum without cutting through the ceramic substrate. FIG. 11 shows a DIP system of this description. The tantalum film 110 deposited on the ceramic substrate 115, has been selectively vaporized to isolate each discrete capacitor 111. Individual connection to the positive polarity is made by individual metal tab leads 112, and common connection to the negative counterelectrodes is made by the metal part 113 which is affixed by soldering or other means to each capacitor body 111. The whole is encapsulated by a plastic material 114 and is illustrated by the cross-sectional view in plane 12—12 by FIG. 12.

The small dimensions and close spacing required of the capacitors for DIP systems is readily achieved by this invention and the compatible planar geometry makes this combination especially attractive. Many combinations and variations beyond those described here are possible for DIp and similar packaging.

Multiple capacitor plates were made on a 0.005 inch thick tantalum substrate measuring 0.118 inch by 0.750 inch, being especially designed for direct assembly in a standard sixteen leaded DIP package. An ink was prepared consisting of a homogeneous mixture of 85% by weight of tantalum powder of particle sizes ranging from 3 to 10 microns, 2½% of a binder such as ELVACITE comprising a polyisobutyl methacrylate (ELVACITE is a Tradename of E.I. DuPont Co., Wilmington, Delaware) and 12½% of a solvent being a glycol butyl ether (n-Butyl Cellosolve supplied by Union Carbide Co.) Other valve metals than tantalum, such as aluminum or titanium will also be suitable provided the substrate has a face of the same valve metal. A 200 mesh screen having 0.0016 inch diameter stainless steel wires and having a 0.001 inch thick transfer immulsion mask was employed. A hot air gun was used to solidify each screened layer before a next layer was successively screened. The rough surface of the resulting composite layer was estimated to reduce the necessary steps of manganous nitrate and pyrolosis by at least 20% over that required for a smooth surface. In addition the adherence of the counterelectrode materials was notably improved. The resulting tantalum pads of each capacitor element are about 0.020 inch thick and lateral dimensions are 0.088 inch by 0.067 inch, with about 0.020 inch spaces between pads. Each of the fourteen capacitor elements on one plate were 4.7 microfarads rated at 6 volts. On another plate they were each 1.2 microfarads rated at 20 volts. Considering the anodizing voltage, the resulting microfarad-volt product of each capacitor element was calculated to be about 70 μfd-V.

From this data it can be shown that the capacitors of this invention have about 600,000 μfd-volts per cubic inch, which is directly comparable to the figure of merit normally obtained by a conventional method comprised of compacting tantalum powder in a mold and subsequently forming the tantalum oxide dielectric and the counterelectrode. This is an astonishing result and was entirely unexpected. It is postulated that by screen printing, tantalum ink compaction is realized through pressure of the screening squeegee and by pressure of the downward deflected screen itself, causing the density of the tantalum powder to increase under the screen leaving a layer of purified solvent on top which is driven off by the subsequent heating. The resulting rough surface of the sintered tantalum pad, which roughness reflects the pattern of the screen, lends support to this theory. It is recognized that other factors may be responsible for these surprising results and the theory advanced is not considered essential to the invention.

Since it is obvious that many changes and modifications can be made in the above described details without departing from the nature and spirit of the invention, it is to be understood that the invention is not limited to said details except as set forth in the appended claims.

What is claimed is:

1. A solid electrolytic capacitor comprised of:

(a) a substrate having at least one face made of a valve metal, said valve metal face serving as the anode connection of said capacitor;

(b) a porous pad of said valve metal being sinter bonded to said valve metal face, said pad having a rough outer surface, said roughness having the pattern of a screen;

(c) a valve metal oxide film formed over the exposed surfaces of said valve metal face and said valve metal pad;

(d) a solid manganese dioxide electrolyte permeating said porous valve metal pad and in contact with said valve metal oxide film; and (e) a counterelectrode over said manganese dioxide electrolyte, said counterelectrode serving as the cathode connection of said capacitor.

2. The capacitor of claim 1 wherein said substrate is comprised of a sheet of said valve metal.

3. The capacitor of claim 1 wherein said substrate is comprised of a ceramic base and said valve metal face is comprised of a film of valve metal having been deposited upon said ceramic substrate.

4. The capacitor of claim 1 wherein said valve metal is tantalum.

5. The capacitor of claim 1 further comprising a first metal lead attached to said valve metal face and a second metal lead attached to said counterelectrode.

6. The capacitor of claim 5 wherein said first and second leads are flat metal tabs that extend in opposite directions.

7. The capacitor of claim 6 further comprising an insulative material encompassing the body of said capacitor and a portion of said tabs.

8. The capacitor of claim 1 additionally comprising a metal bar having been welded to said valve metal face, said bar and said pad having essentially the same thickness such that said bar is suitable for use as an anode connection and said capacitor is capable of being connected to an integrated circuit substrate by said counterelectrode and said anode connection bar by a normal flip-chip method.

9. The capacitor of claim 8 further comprising a first flat metal tab connected to said cathode bar and a second metal tab connected to said anode counterelectrode, said first and second tabs lying in essentially the same plane and extending from said capacitor in opposite directions.

10. The capacitor of claim 1 further comprising one or more additional porous pads of said valve metal each having been sinter bonded to a separated portion of said valve metal face, each said additional pad having a valve metal oxide film, a solid manganese dioxide electrolyte, and a counterelectrode; such that a plurality of solid electrolyte valve metal capacitor elements are formed on the same substrate.

11. The capacitor of claim 10, additionally comprising a metal part, said counterelectrodes of said plurality of said capacitor elements being connected to said metal part, such that said metal part serves as a common cathode connection for all said capacitor elements.

12. The capacitor of claim 1 further comprising one or more additional porous pads of said valve metal having been sinter bonded to said valve metal face, each said additional pad having a valve metal oxide film; a solid manganese dioxide electrolyte, and a counterelectrode; such that a plurality of solid electrolyte valve metal capacitor elements are formed on the same substrate.

13. The capacitor of claim 12 further comprising a lead wire attached to said valve metal face, serving as a common anode lead wire to said plurality of capacitor elements; and a plurality of cathode lead wires, each said cathode wire being attached to one said counterelectrode of each said capacitor.

14. The capacitor of claim 12 wherein said plurality of capacitor elements is comprised of two said capacitor elements, such that in effect a single non-polar solid electrolytic capacitor is created when connections are made at one and the other of said counterelectrodes as may be realized by a normal flip-chip connection to an integrated circuit substrate.

15. The capacitor of claim 14 wherein said connections at one and the other of said counterelectrodes are made by one and another flat metal tabs that lie in the same plane and extend from said non-polar capacitor in opposite directions.

16. The capacitor of claim 15 further comprising a housing of an insulative compound encompassing the body of said non-polar capacitor and a portion of said tabs.

* * * * *